United States Patent
Lemler

(10) Patent No.: US 9,051,954 B2
(45) Date of Patent: Jun. 9, 2015

(54) BLIND, BULBING, TACKING RIVET AND METHOD OF INSTALLATION

(71) Applicant: PCC Structurals, Inc., Portland, OR (US)

(72) Inventor: Caleb Lemler, Santa Ana, CA (US)

(73) Assignee: SPS Technologies, LLC, Jenkintown, PA (US)

( * ) Notice: Subject to any disclaimer, the term of this patent is extended or adjusted under 35 U.S.C. 154(b) by 0 days.

(21) Appl. No.: 14/215,544

(22) Filed: Mar. 17, 2014

(65) Prior Publication Data

US 2014/0271039 A1    Sep. 18, 2014

Related U.S. Application Data

(60) Provisional application No. 61/794,876, filed on Mar. 15, 2013.

(51) Int. Cl.
*F16B 13/04* (2006.01)
*F16B 19/10* (2006.01)

(52) U.S. Cl.
CPC ......... *F16B 19/1081* (2013.01); *F16B 19/1054* (2013.01); *Y10T 29/49943* (2015.01); *F16B 19/109* (2013.01)

(58) Field of Classification Search
USPC ........... 411/32, 34, 37, 39, 43, 44, 54, 55, 71, 411/73, 80.6, 501
See application file for complete search history.

(56) References Cited

U.S. PATENT DOCUMENTS

| | | | |
|---|---|---|---|
| 2,030,165 A | | 2/1936 | Huck |
| 2,030,166 A | * | 2/1936 | Huck ................... 72/370.01 |
| 2,030,168 A | * | 2/1936 | Miller .................... 411/34 |
| 2,767,877 A | * | 10/1956 | Newsom ................. 403/167 |
| 2,803,984 A | * | 8/1957 | Swenson ................. 411/41 |
| 3,236,143 A | * | 2/1966 | Wing .................... 411/34 |
| 3,285,121 A | * | 11/1966 | Siebol ................... 411/43 |

(Continued)

FOREIGN PATENT DOCUMENTS

| EP | 0497455 A1 | 8/1992 |
|---|---|---|
| EP | 0691479 A1 | 6/1995 |

(Continued)

OTHER PUBLICATIONS

International Search Report and Written Opinion of the International Searching Authority for International Patent Application No. PCT/US2014/030200 mailed on Jul. 16, 2014.

*Primary Examiner* — Roberta Delisle
(74) *Attorney, Agent, or Firm* — Brinks Gilson & Lione

(57) ABSTRACT

A tacking fastener for securing workpieces together to form a temporary assembly includes a stem and an elongated sleeve. The stem includes a head disposed at a proximal end portion, a tapered portion extending between the proximal end portion and a central portion, a break notch extending around a circumference of the proximal end portion between the head and the tapered portion, and a plurality of ridges and grooves disposed along a distal end portion. The elongated sleeve is disposed around the stem between the head and the plurality of ridges and grooves and configured to form a tacking rivet upon installation of the tacking fastener. The elongated sleeve is plastically deformed during installation to form a plurality of bulbs, thereby being capable of securing workpieces of varying grip length. The stem and the tacking rivet remain within the workpieces after the workpieces are secured.

22 Claims, 9 Drawing Sheets

(56) References Cited

U.S. PATENT DOCUMENTS

| | | | |
|---|---|---|---|
| 3,515,419 A * | 6/1970 | Baugh | 403/408.1 |
| 4,285,265 A | 8/1981 | Rieper | |
| 4,580,936 A * | 4/1986 | Francis et al. | 411/38 |
| 4,642,010 A | 2/1987 | Bradley et al. | |
| 4,784,551 A * | 11/1988 | Kendall | 411/43 |
| 4,958,971 A * | 9/1990 | Lacey et al. | 411/38 |
| 6,004,086 A * | 12/1999 | Gand et al. | 411/38 |
| 6,186,717 B1 | 2/2001 | Cosenza | |
| 6,406,237 B1 | 6/2002 | Wojciechowski et al. | |
| 6,499,926 B2 | 12/2002 | Keener | |
| 6,746,192 B2 * | 6/2004 | Eshraghi | 411/37 |
| 6,761,520 B1 * | 7/2004 | Dise | 411/38 |
| 7,303,366 B2 * | 12/2007 | Smith | 411/43 |
| 7,980,800 B2 * | 7/2011 | Kleinman et al. | 411/43 |
| 2003/0082025 A1 | 5/2003 | Luhm | |
| 2003/0123949 A1 | 7/2003 | Eshraghi | |
| 2005/0260056 A1 * | 11/2005 | Denham | 411/43 |
| 2007/0243035 A1 * | 10/2007 | Pratt | 411/15 |

FOREIGN PATENT DOCUMENTS

| | | |
|---|---|---|
| EP | 1607639 A1 | 12/2005 |
| GB | 402813 | 12/1933 |

* cited by examiner

BLIND, BULBING, TACKING RIVET AND METHOD OF INSTALLATION

CROSS-REFERENCE TO RELATED APPLICATIONS

This application claims the benefit of U.S. Provisional Patent Application No. 61/794,876, filed on Mar. 15, 2013. The disclosure of the above application is incorporated herein by reference.

FIELD

The present disclosure relates to rivets, and more specifically to tacking rivets that temporarily fasten workpieces together.

BACKGROUND

The statements in this section merely provide background information related to the present disclosure and may not constitute prior art.

Tacking rivets are used to temporarily fasten adjacent workpieces together for positioning purposes. The tacking rivets are inserted into only some of the apertures of the workpieces to properly align all the apertures of the workpieces before permanent rivets are inserted to permanently fasten the workpieces. After the permanent rivets are inserted into the remaining apertures, the tacking rivets are removed, for example, by drilling through the tacking rivets. More permanent rivets are then inserted into the apertures previously occupied by the tacking rivets to further fasten the workpieces.

The typical tacking rivet engages the workpieces by radially expanding a body of the tacking rivet to result in an interference fit between the body of the tacking rivets and the aperture surfaces. This interference fit may damage the aperture surfaces, making it difficult to insert the permanent rivet later due to the changed size of the apertures. Moreover, it is also difficult to remove the typical tacking rivets without damaging the aperture surfaces of the workpieces. Further, the typical tacking rivets of a specific length may be suitable for workpieces of a specific thickness. Therefore, different sizes of the typical tacking rivets are needed for workpieces of different thicknesses, thereby increasing inventory costs.

SUMMARY

In one form, a tacking fastener is provided for securing at least two workpieces together to form a temporary assembly. The tacking fastener includes a stem and an elongated sleeve. The stem defines a proximal end portion, a central portion, and a distal end portion. The stem includes a head disposed at the proximal end portion, a tapered portion extending between the proximal end portion and the central portion, a break notch extending around a circumference of the proximal end portion between the head and the tapered portion, and a plurality of ridges and grooves disposed along the distal end portion. The elongated sleeve is disposed around the stem between the head and the plurality of ridges and grooves. The elongated sleeve is configured to form a tacking rivet upon installation of the tacking fastener. The elongated sleeve is plastically deformed during installation to form a plurality of bulbs, thereby being capable of securing workpieces of varying grip length. The stem and the tacking rivet remain within the workpieces after the workpieces are secured together.

In another form, a structural assembly includes at least two workpieces and a tacking fastener that secures the two workpieces together. The tacking fastener includes a stem and an elongated sleeve. The stem defines a proximal end portion, a central portion, and a distal end portion. The stem includes a head disposed at the proximal end portion. The elongated sleeve is disposed around the stem between the head and the plurality of ridges and grooves. The elongated sleeve is configured to form a tacking rivet upon installation of the tacking fastener. The elongated sleeve is plastically deformed during installation to form a plurality of bulbs, thereby being capable of securing workpieces of varying grip length. The stem and the tacking rivet remain within the workpieces after the workpieces are secured together.

In still another form, a method of installing a tacking fastener to secure at least two workpieces together is provided. The method includes inserting a stem and sleeve through aligned apertures of the workpieces; placing a flange of the sleeve against a distal surface of a first workpiece; pulling the stem distally away from the distal surface of the first workpiece such that a head of the stem plastically deforms the sleeve against a proximal surface of a second workpiece to form a tacking rivet. The elongated sleeve is plastically deformed during installation to form a plurality of bulbs, thereby being capable of securing workpieces of varying grip length. The stem and the tacking rivet remain within the workpieces after the workpieces are secured together.

In still another form, a tacking fastener is provided for securing at least two workpieces together to form a temporary assembly. The tacking fastener includes a stem and an elongated sleeve. The stem defines a proximal end portion, a central portion, and a distal end portion. The stem includes a head disposed at the proximal end portion. The elongated sleeve is disposed around the stem proximate the head. The elongated sleeve is configured to form a tacking rivet upon installation of the tacking fastener. The elongated sleeve is plastically deformed during installation to form a plurality of bulbs, thereby being capable of securing workpieces of varying grip length. The stem and the tacking rivet remain within the workpieces after the workpieces are secured together.

In still another form, a mandrel for use in installing a tacking fastener for securing at least two workpieces together to form a temporary assembly is provided. The mandrel defines a proximal end portion, a central portion, and a distal end portion. The mandrel includes a head disposed at the proximal end portion, a tapered portion extending between the proximal end portion and the central portion, a break notch extending around a circumference of the proximal end portion between the head and the tapered portion, and a plurality of ridges and grooves disposed along the distal end portion. The elongated sleeve disposed around the mandrel is plastically deformed during installation to form a plurality of bulbs, thereby being capable of securing workpieces of varying grip length.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

In order that the invention may be well understood, there will now be described an embodiment thereof, given by way of example, reference being made to the accompanying drawing, in which.

Figure 5:
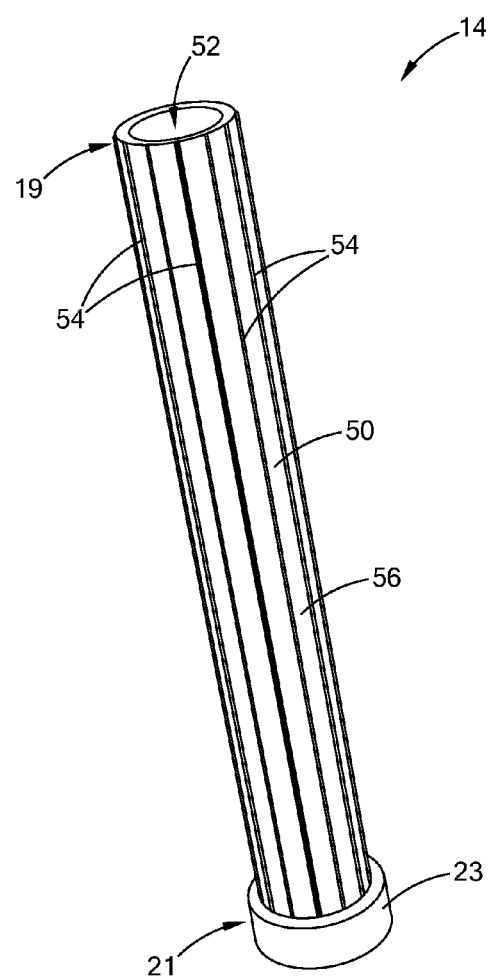
Figure 6:
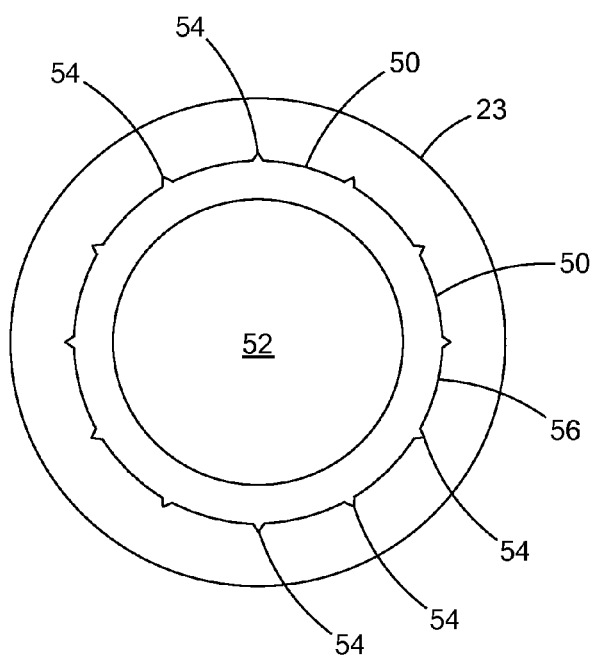

FIG. 5 is a perspective view of an elongated sleeve of a tacking rivet assembly constructed in accordance with the teachings of the present disclosure; and FIG. 6 is an end view of an elongated sleeve of a tacking rivet assembly constructed in accordance with the teachings of the present disclosure; and FIGS. 7A to 7F are schematic views showing installation of the tacking rivet assembly to workpieces.

Corresponding reference numerals indicate corresponding parts throughout the several views of the drawings.

DETAILED DESCRIPTION

The following description is merely exemplary in nature and is not intended to limit the present disclosure, application, or uses.

Figure 1:
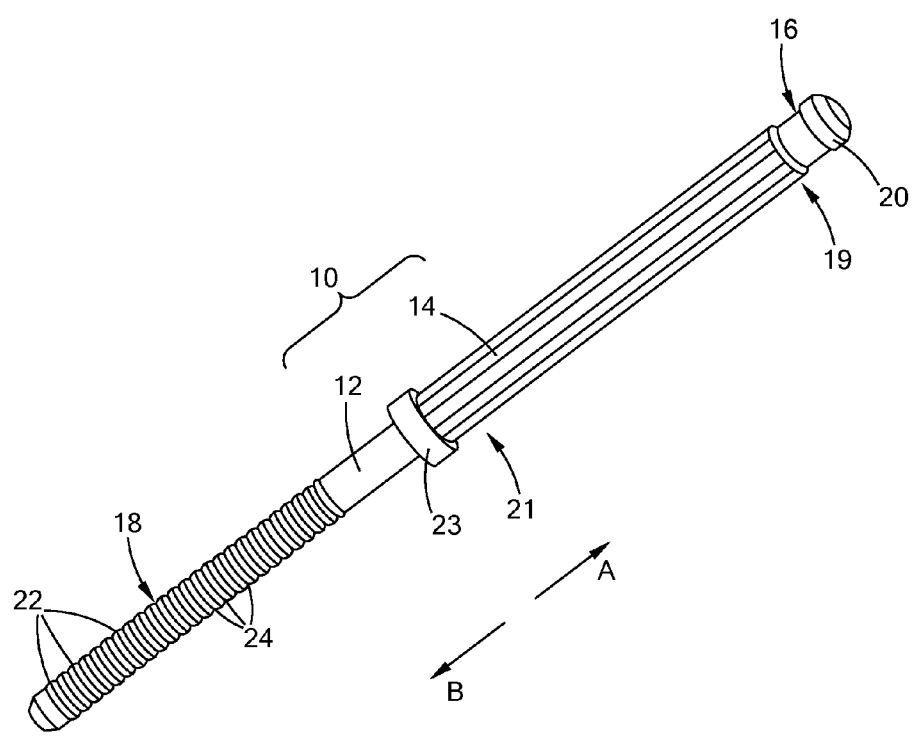
FIG. 1 is a perspective view of a tacking rivet assembly constructed in accordance with the teachings of the present disclosure.

Referring to FIG. 1, a tacking rivet assembly 10 constructed in accordance with the teachings of the present disclosure is a two-piece structure and includes a stem 12 (also called a mandrel) and an elongated sleeve 14 disposed around the stem 12. The sleeve 14, after plastically deformed, is used as a temporary rivet for fastening workpieces, and the stem 12 is a tool used to plastically deform the sleeve 14, which will be described in more detail below. The stem 12 includes a proximal end portion 16 and a distal end portion 18. The stem 12 includes a head 20 at the proximal end portion 16, and a plurality of ridges 22 and grooves 24 disposed along the distal end portion 18. The sleeve 14 includes a proximal end 19 and a distal end 21. An enlarged portion, in the form of a flange 23, is disposed at the distal end 19 of the sleeve 14. A portion of the proximal end portion 16 of the stem 12 and the head 20 protrude from the proximal end 19 of the sleeve 14.

In the present disclosure, "a proximal end," "a proximal end portion" or "a proximal surface" is used to indicate an end, portion or surface of a component that is located closer to the head 20 of the stem 12. Arrow A indicates a proximal direction, which is a direction parallel to the longitudinal axis of the tacking rivet assembly 10 and pointing toward the head 20 of the stem 12. "A distal end," "a distal end portion" or "a distal surface" is used to indicate an end, portion or surface of a component that is located away from the head 20 and thus is closer to the ridges 22 and grooves 24 of the stem 12. Arrow B indicates a distal direction, which is a direction parallel to the longitudinal axis of the tacking rivet assembly 10 and pointing away from the head 20.

Figure 2:
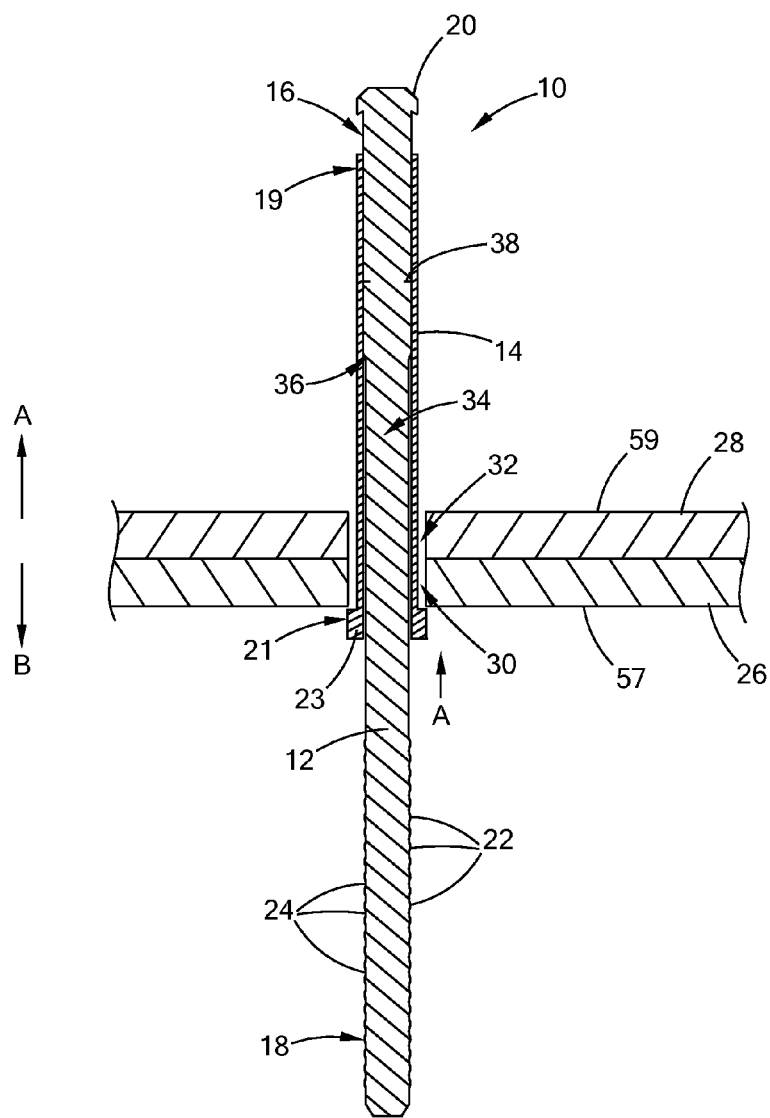
FIG. 2 is a cross-sectional view of a tacking rivet assembly assembled to workpieces to fasten the workpieces together.

Referring to FIG. 2, the tacking rivet assembly 10 is configured to temporarily fasten two or more workpieces. FIG. 2 shows only two workpieces 26 and 28 for illustrative purposes and does not limit application of the tacking rivet assembly 10 to two workpieces. The tacking rivet assembly 10 is inserted into apertures 30 and 32 of the first and second workpieces 26 and 28. Before the elongated sleeve 14 is plastically deformed by the stem 12, the tacking rivet assembly 10 may be loosely inserted into the apertures 30 and 32 of the workpieces 26 and 28.

The stem 12 further includes a central portion 34 disposed between the proximal end portion 16 and the distal end portion 18. The central portion 34 has an outside diameter smaller than the outside diameter of the proximal end portion 16. A tapered portion 36 is formed between the proximal end portion 16 and the central portion 34. The proximal end portion 16 defines a break notch 38 extending around a circumference of the proximal end portion 16 and disposed between the head 20 and the tapered portion 36.

The plurality of ridges 22 and grooves 24 are disposed along the distal end portion 18 to allow for gripping by a tool (not shown) when the tacking rivet assembly 10 is installed to and removed from the first and second workpieces 26 and 28. The elongated sleeve 14 is disposed around the stem 12 and between the head 20 and the plurality of ridges 30 and grooves 32.

Figure 3:
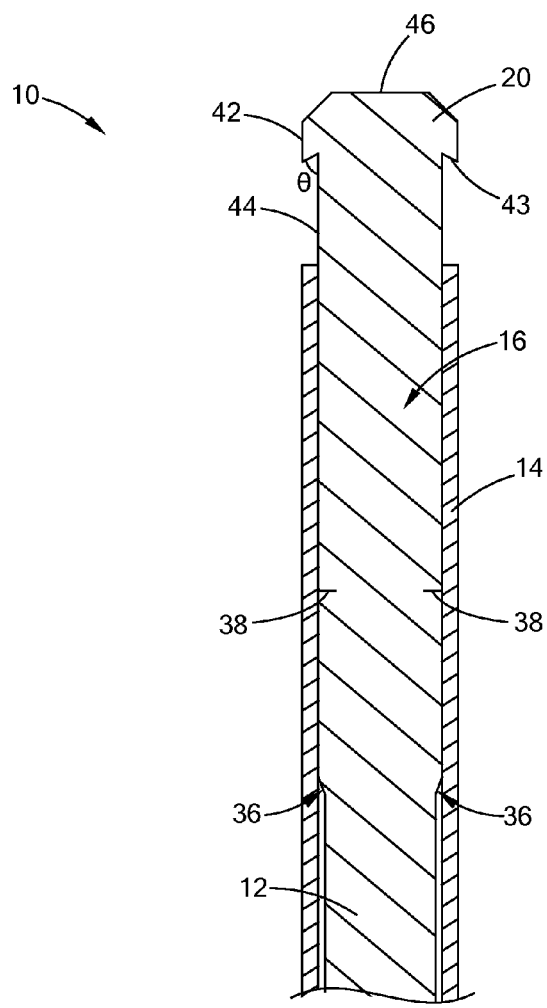
FIG. 3 is an enlarged view of a proximal end portion of the tacking rivet assembly.

Referring to FIG. 3, the head 20 of the stem 12 includes a flange 42 having a slant surface 43 that defines an acute angle $\theta$ relative to a sidewall 44 of the proximal end portion 16. The head 20 has a chamfered upper surface 46.

Figure 4:
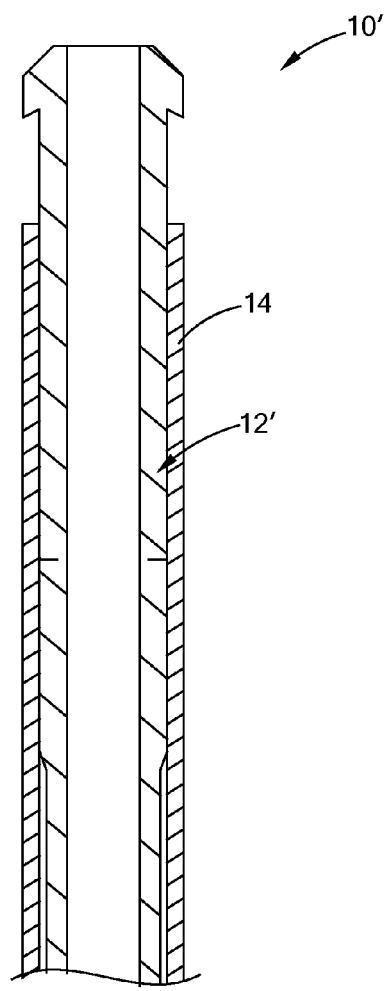
FIG. 4 is a view similar to FIG. 3 showing a variant of a tacking rivet assembly.

Referring to FIG. 4, according to a variant of the present disclosure, a tacking rivet assembly 10' includes a stem 12' and a sleeve 14. The stem 12' is different from stem 12 of FIGS. 1 to 3 in that the stem 12 has a hollow structure. When the stem 12' is made of a material having a higher mechanical strength, the stem 12' can have a hollow structure without compromising the operation of the tacking rivet assembly 10' while reducing manufacturing costs. As an example, the stem 12, 12' may be made of an Aluminum material.

Referring to FIGS. 5 and 6, the elongated sleeve 14 has a hollow body 50 defining an opening 52, in which the stem 12 is inserted. The flange 23 is disposed at the distal end 21 of the elongated sleeve 14 and extends radially and outwardly from the hollow body 50. The flange 23 has an outside diameter greater than that of the hollow body 50. The hollow body 50 defines a plurality of axial ridges 54 on an outer surface 56 and may be of a red color.

Referring back to FIG. 2, to temporarily fasten the first and second workpieces 26 and 28, the elongated sleeve 14 is first inserted into the apertures 30 and 32 of the first and second workpieces 26 and 28 along the proximal direction A from the side of the first workpiece 26 until the flange 23 abuts against a distal surface 57 of the first workpiece 26. Next, the stem 12 is inserted into the apertures 30 and 32 along the distal direction B from the side of the second workpiece 28. The distal end portion 18 and the central portion 34 of the stem 12 have an outside diameter smaller than that of the proximal end portion 16. Therefore, the stem 12 can be easily inserted through the elongated sleeve 14 until when the head 20 contacts the proximal end 19 of the sleeve 14 or when a frictional contact between the proximal end portion 16 of the stem 12 and the sleeve 14 prevents further movement of the stem 12.

Alternatively, the apertures 30 and 32 may have a diameter that is greater than the outside diameter of the head 20. Therefore, the sleeve 14, together with the stem 12, may be inserted into the apertures 30 and 32 of the workpieces 26 and 28 as a unit from the side of the first workpiece 26. In this case, the sleeve 14 may be loosely disposed in the apertures 30 and 32 with a significant gap between the aperture surfaces and the sleeve 14. As will become clear in the following description, a secure connection between the sleeve 14 and the workpieces 26 and 28 does not depend on the contact between the sleeve 14 and the aperture surfaces that define the apertures 30 and 32. Therefore, the gap does not affect the secured connection between the sleeve 14 and the workpieces 26 and 28.

Figure 7A:
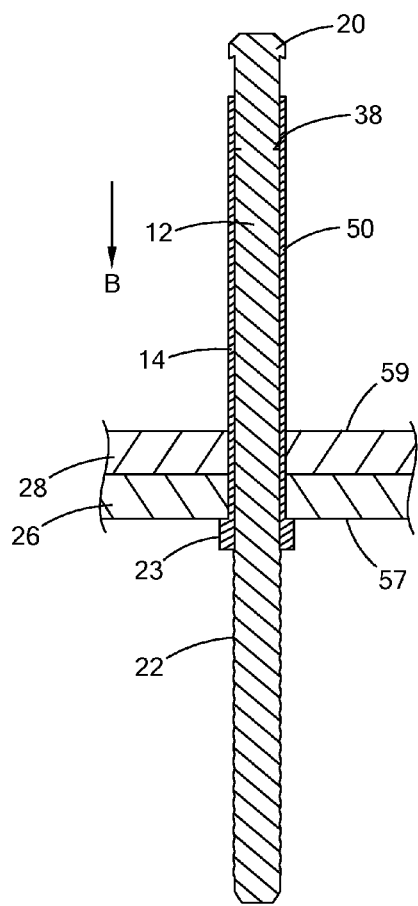
Figure 7B:
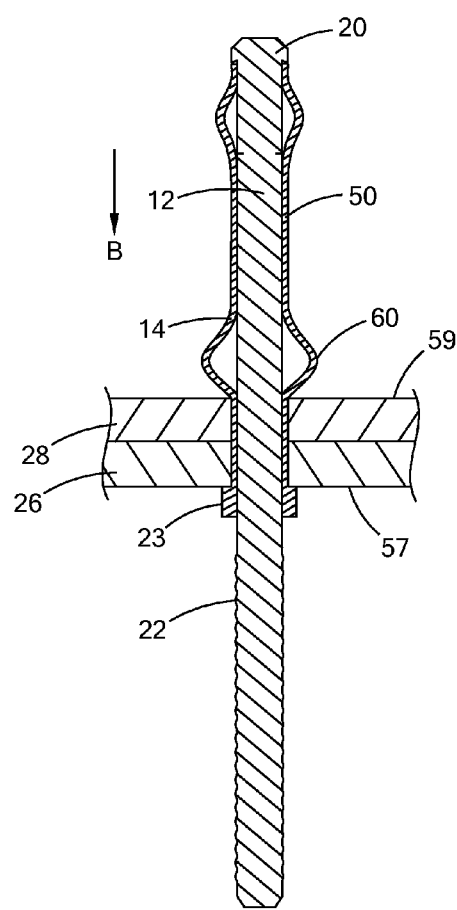

FIGS. 7A to 7B show the process of installing the tacking rivet assembly 10 to the workpieces 26 and 28. Only a part of the stem 12 proximate the head 20 is shown to clearly illustrate the movement of the stem 12. FIG. 7A is similar to FIG. 2 where the head 20 does not contact the proximal end 19 of the elongated sleeve 14 and the sleeve 14 remains in its original form. A significant portion of the hollow body 50 of the sleeve 14 is disposed outside and extends from the second workpiece 28. A fixture (not shown) is used to maintain the position of the flange 23 against the distal surface 57 of the first workpiece 26. A gripping tool (not shown) grips the ridges 22 and the grooves 24 (not shown in FIG. 7A) to pull the stem 12 along the distal direction B. In FIG. 7B, when the stem 12 is pulled in the distal direction B, the head 16 is moved in the distal direction B and starts to contact the proximal end 19 of the sleeve 14. The hollow body 50 of the sleeve 14 is constrained between the head 20 of the stem 12 and the flange 23 of the sleeve 14. As the stem 12 continues to be pulled, the head 20 pushes the hollow body 50 of the elongated sleeve 14, causing buckling of the hollow body 50. The compressive force applied to the hollow body 50 of the sleeve 14 causes a portion of the hollow body 50 of the elongated sleeve 14 to undergo plastic deformation and expands outwardly and laterally to form a bulb 60. The bulb 60 is likely to be formed first adjacent to the second workpiece 28 to engage the proximal surface 59 of the first workpiece 26. Another portion of the hollow body 50 of the sleeve 14 may also start to undergo plastic deformation and expands slightly.

Figure 7C:
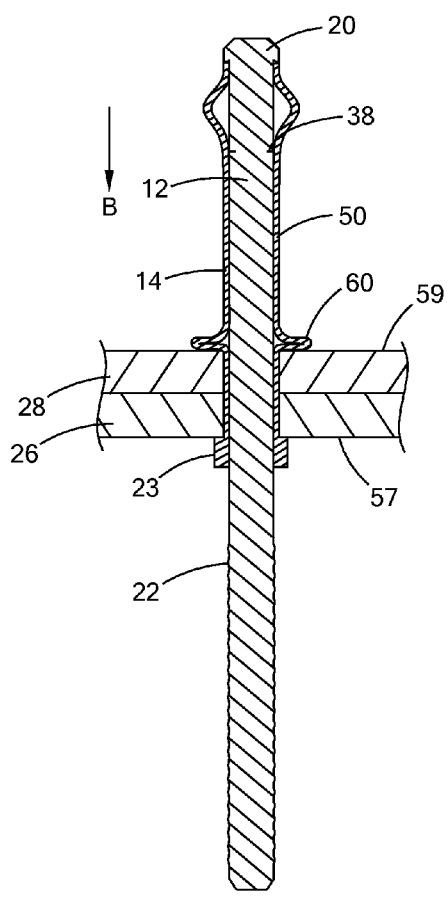
Figure 7D:
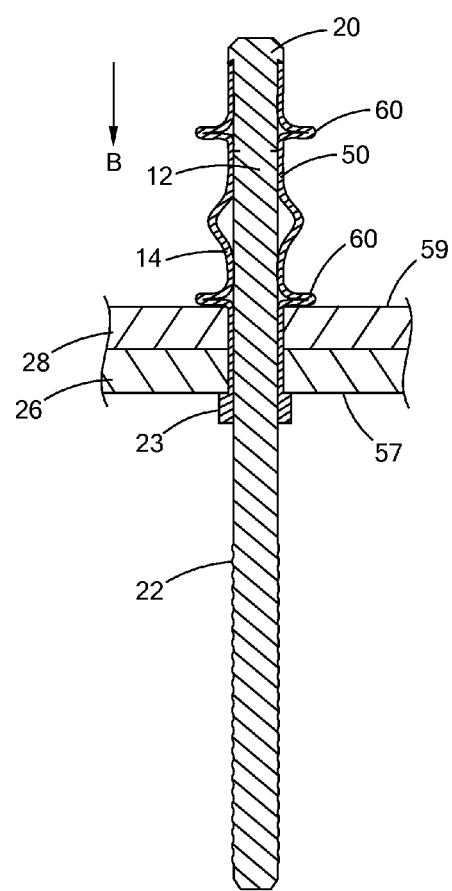
Figure 7E:
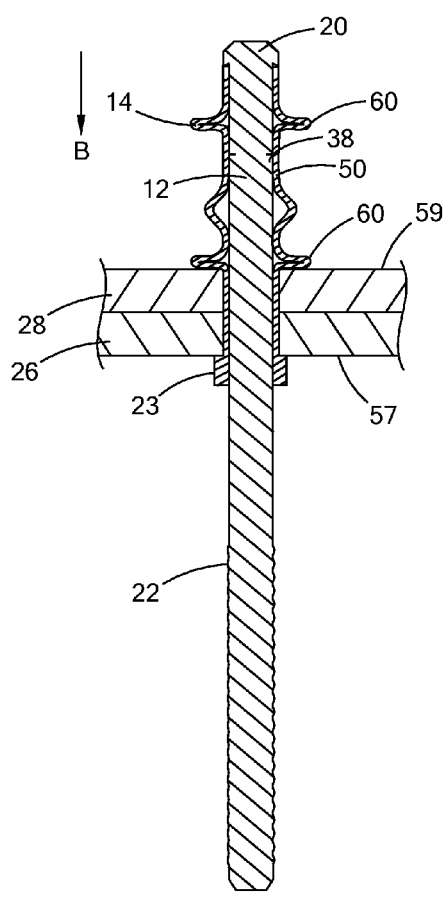

As shown in FIGS. 7C to 7E, as the pulling of the stem 12 continues, the head 20 is moved further toward the workpieces 26 and 28 to cause plastic deformation in more parts of the hollow body 50. More portions of the hollow body 50 expand outwardly and radially to form more bulbs 60. The hollow body 50 may stop being deformed when the hollow body 50 reaches an effective length where buckling under the same compressive force can no longer occur or when all portions of the hollow body 50 of the sleeve 14 have undergo plastic deformation to form bulbs 60 and there is no available part at the hollow body 50 to form bulbs 60.

Figure 7F:
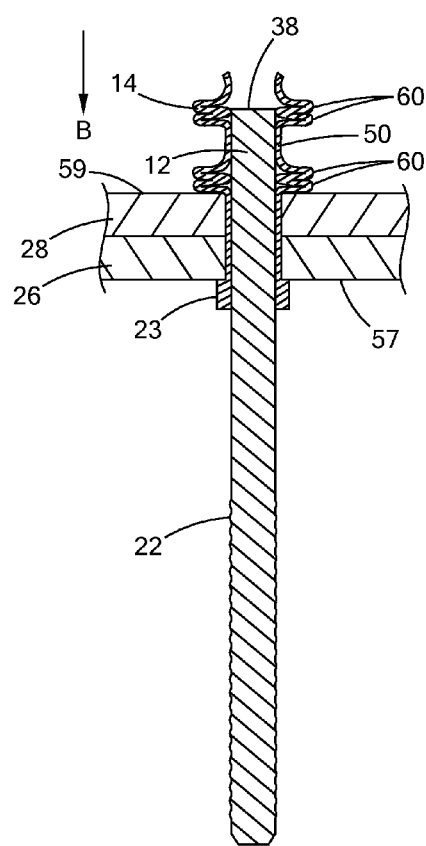

As shown in FIG. 7F, when the head 20 cannot be moved further down, the hollow body 50 of the sleeve 14 forms a number of bulbs 60 that expands outwardly and radially. After the stem 12 is inserted and pulled to push the tubular body 50 of the sleeve 14 to form the plurality of bulbs 60, the stem 12 remains in the elongated sleeve 14 and eventually fractures at the break notch 38 as shown, resulting in a recessed stem break. The fixture (not shown) for fixing the flange 23 of the sleeve 14 is then removed. Therefore, the workpieces 26 and 28 are clamped between the bulbs 60 and the flanges 23.

The number of bulbs 60 formed during installation depends on the length of the tubular body 50 of the sleeve 14 that protrudes outside the second workpiece 28. Therefore, for a given length of the elongated sleeve 14, the number of bulbs 60 that would be formed during installation also depends on the thickness of the workpieces 26 and 28. Therefore, the tacking rivet assembly 10 that has a particular length of the sleeve 14 can be used to fasten workpieces of varying thickness. Any number of bulbs 60, including one, can be formed to secure the elongated sleeve 14 to the workpieces 26 and 28. The length of the hollow portion 50 of the sleeve 14 that extends from the second workpiece 28 should have a sufficient length to allow for sufficient plastic deformation to form at least one bulb 60 against the proximal surface 59 of the second workpiece 28. The number of bulbs 60 may be five.

The axial ridges 54 on the outer surface 56 of the tubular body 50 of the elongated sleeve 14 are designed to be plastically deformed to facilitate formation of bulbs 60. While the ridges 54 are shown to extend axially along the entire length of the hollow body 50, it is understood that the ridges 54 may extend only a portion of the length of the hollow body 50 without departing from the scope of the present disclosure. The length of the ridges 54 may depend on the thickness of the workpieces 26 and 28 and may be configured to provide varying grip length. The grip length varies between about 0.100" and about 0.800". Any number of the ridges 54 may be formed without departing from the scope of the present disclosure.

As previously described, the head 20 has a flange 42 defining a slant surface 43, which defines an acute angle θ relative to the side wall 44 of the proximal end portion 16. The slant surface 43 helps maintain the contact between the proximal end 19 of the elongated sleeve 14 and the head 20 during the pulling process of the stem 12 despite that the head 20 protrudes slightly and laterally from the sidewalls 44 of the stem 12.

To remove the temporary rivet formed by the plastic deformed sleeve 14 and the stem 12 from the workpieces 26 and 28, the head 20 of the stem 12 may be drilled through such that the stem 12 may be removed from the assembly first. The break notch 38 formed at the proximal portion 16 of the stem 12 facilitates the break-away of the stem 12 and removal of the stem 12. After the stem 12 is removed, the sleeve 14 can then be removed.

The tacking rivet assembly 10 of the present disclosure has the advantage of easy installation and removal without damaging the aperture surfaces. The workpieces 26 and 28 are fastened by clamping the workpieces 26 and 28 between the plastically deformed bulbs 60 and the flange 23. The bulbs 60 are disposed against the proximal surface 59 of the second workpiece 28. The flange 23 is disposed against the distal surface 57 of the first workpiece 26. No or only light expansion of the sleeve 14 occurs inside the apertures 30 and 32. Therefore, the removal of the tacking rivet assembly 10 would not damage the aperture surfaces to adversely affect the later installation of permanent rivets.

Moreover, with the tacking rivet assembly 10 of the present disclosure, the workpieces are fastened by clamping, rather than frictional engagement between the sleeve 14 and the aperture surfaces the sleeve 14. The assembly tolerance between the tacking rivet assembly 10 and aperture surfaces becomes less important, thereby reducing manufacturing costs. Further, since the fastening of the tacking rivet assembly 10 to the workpieces is not achieved by an interference fit, the apertures 30 and 32 and the sleeve 14 do not have to have the same shape. For example, the apertures 30 and 32 may have a circular shape, whereas the hollow body 50 of the sleeve 14 may have a cross section defining a shape other than a circular shape.

Furthermore, with the tacking rivet assembly 10 of the present disclosure, the sleeve 14 is plastically deformed to form a number of bulbs 60 to clamp the workpieces, and the length of the sleeve 14 is reduced after plastic deformation. The required length of the sleeve 14 does not highly depend on the thickness of the workpieces to be clamped. Therefore, the tacking rivet assembly 10 of a particular length can be used to fasten workpieces of varying thicknesses.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A tacking fastener for securing at least two workpieces together to form a temporary assembly, the tacking fastener consisting of:
   a stem defining a proximal end portion, a central portion, and a distal end portion, the stem comprising:
      a head disposed at the proximal end portion;
      a tapered portion extending between the proximal end portion and the central portion;
      a break notch extending around a circumference of the proximal end portion, the break notch being located between the head and the tapered portion; and
      a plurality of ridges and grooves disposed along the distal end portion; and
   an elongated sleeve disposed around the stem between the head and the plurality of ridges and grooves, the elongated sleeve configured to form a tacking rivet upon installation of the tacking fastener,
   wherein the elongated sleeve is plastically deformed during installation to form a plurality of bulbs, thereby being capable of securing workpieces of varying grip length, and the stem and the tacking rivet remain within the workpieces after the workpieces are secured together.

2. The tacking fastener according to claim 1, wherein the head of the stem defines a flange that defines an acute angle with a sidewall of the proximal end portion.

3. The tacking fastener according to claim 1, wherein the number of bulbs is five.

4. The tacking fastener according to claim 1, wherein the stem is an Aluminum material.

5. The tacking fastener according to claim 1, wherein the grip length varies between about 0.100" and about 0.800".

6. The tacking fastener according to claim 1, wherein the sleeve defines axial ridges.

7. The tacking fastener according to claim 1, wherein the stem is hollow.

8. The tacking fastener according to claim 1, wherein the sleeve is a red color.

9. The tacking fastener according to claim 1, wherein the head of the stem defines a chamfered upper surface.

10. A structural assembly comprising:
    at least two workpieces;
    a tacking fastener securing the two workpieces together, the tacking fastener consisting of:
       a stem defining a proximal end portion, a central portion, and a distal end portion, the stem comprising a head disposed at the proximal end portion; and
       an elongated sleeve disposed around the stem between the head and the plurality of ridges and grooves, the elongated sleeve configured to form a tacking rivet upon installation of the tacking fastener,
       wherein the elongated sleeve is plastically deformed during installation to form a plurality of bulbs, thereby being capable of securing workpieces of varying grip length, and the stem and the tacking rivet remain within the workpieces after the workpieces are secured together.

11. The structural assembly according to claim 10, further comprising a plurality of ridges and grooves disposed along the distal end portion of the stem.

12. The structural assembly according to claim 10, further comprising a plurality of ridges and grooves disposed proximate the head.

13. A method of installing a tacking fastener to secure at least two workpieces together, the method comprising:
    inserting a tacking fastener consisting of a stem and a sleeve through aligned apertures of the workpieces;
    placing a flange of the sleeve against a distal surface of a first workpiece;
    pulling the stem distally away from the distal surface of the first workpiece such that a head of the stem plastically deforms the sleeve against a proximal surface of a second workpiece to form a tacking rivet,
    wherein the elongated sleeve is plastically deformed during installation to form a plurality of bulbs, thereby being capable of securing workpieces of varying grip length, and the stem and the tacking rivet remain within the workpieces after the workpieces are secured together.

14. The method according to claim 13, wherein axial ribs of the sleeve are deformed into walls of the aligned apertures during installation.

15. The method according to claim 13, wherein a portion of the head of the stem is plastically deformed during installation.

16. The method according to claim 13, wherein stem fractures upon completion of the installation and is recessed.

17. A tacking fastener for securing at least two workpieces together to form a temporary assembly, the tacking fastener consisting of:
    a stem defining a proximal end portion, a central portion, and a distal end portion, the stem comprising a head disposed at the proximal end portion; and
    an elongated sleeve disposed around the stem proximate the head, the elongated sleeve configured to form a tacking rivet upon installation of the tacking fastener,
    wherein the elongated sleeve is plastically deformed during installation to form a plurality of bulbs, thereby being capable of securing workpieces of varying grip length, and the stem and the tacking rivet remain within the workpieces after the workpieces are secured together.

18. The tacking fastener according to claim 17, wherein the stem further comprises a plurality of ridges and grooves disposed along the distal end portion.

19. The tacking fastener according to claim 17, wherein the stem further comprises a plurality of ridges and grooves disposed proximate the head.

20. The tacking fastener according to claim 17, wherein the stem further comprises a tapered portion extending between the proximal end portion and the central portion.

21. The tacking fastener according to claim 17, wherein the stem further comprises a break notch extending around a circumference of the proximal end portion.

22. A mandrel for use in installing a tacking fastener for securing at least two workpieces together to form a temporary assembly, the mandrel defining a proximal end portion, a central portion, and a distal end portion, the mandrel comprising:
    a head disposed at the proximal end portion;
    a tapered portion extending between the proximal end portion and the central portion;
    a break notch extending around a circumference of the proximal end portion, the break notch being located between the head and the tapered portion; and
    a plurality of ridges and grooves disposed along the distal end portion,
    wherein an elongated sleeve disposed around the mandrel is plastically deformed during installation to form a plurality of bulbs, thereby being capable of securing workpieces of varying grip length.

* * * * *